Oct. 9, 1951

C. F. DUERR, JR  
APPARATUS FOR TESTING ELECTRICALLY  
ACTUATED INDICATING INSTRUMENTS 2,570,781

Filed June 15, 1945

INVENTOR.  
Carl F. Duerr, Jr.  
BY  
Harry P. Canfield  
ATTORNEY

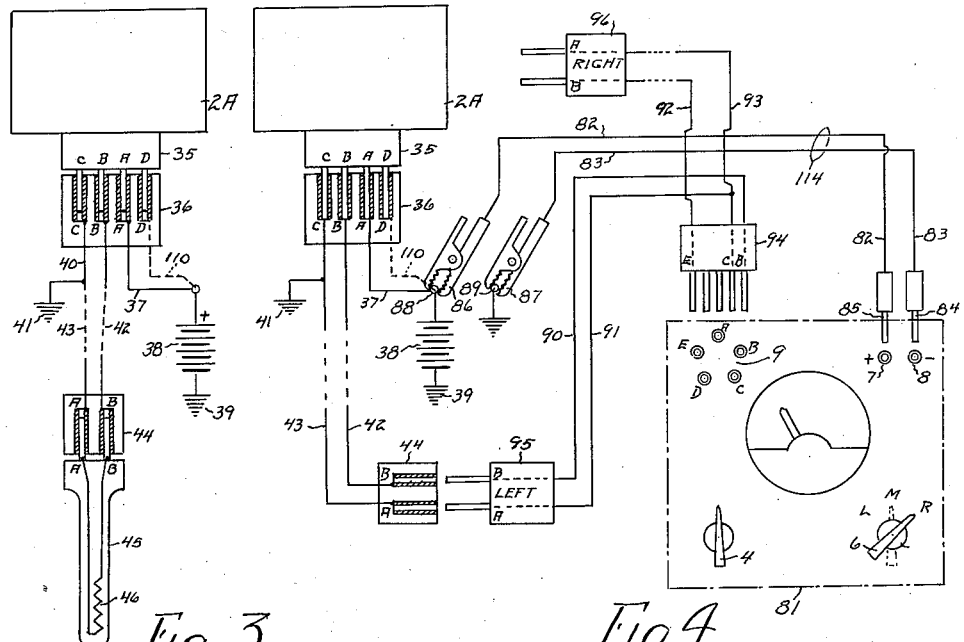
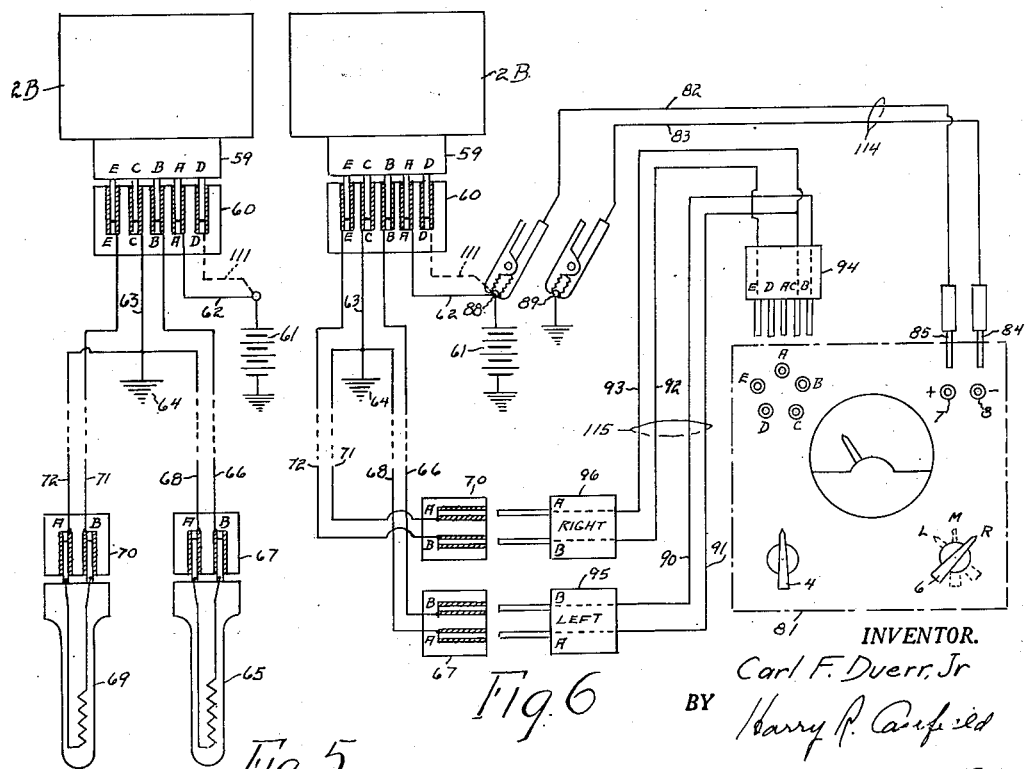
INVENTOR.
Carl F. Duerr, Jr
BY
Harry R. Canfield
ATTORNEY

INVENTOR.
Carl F. Duerr, Jr.
BY
ATTORNEY

Patented Oct. 9, 1951

2,570,781

UNITED STATES PATENT OFFICE 2,570,781

APPARATUS FOR TESTING ELECTRICALLY ACTUATED INDICATING INSTRUMENTS

Carl F. Duerr, Jr., Gates Mills, Ohio, assignor, by mesne assignments, of 30/100 to Ralph R. Roemer, 35/100 to Louise E. Roemer, 25/100 to William R. Kiefer, and 10/100 to J. Everette Tompkins, all of Cleveland, Ohio Application June 15, 1945, Serial No. 599,611

5 Claims. (Cl. 175—183)

This invention relates to the testing of electrically-actuated temperature-indicating instruments and associated apparatus.

Perhaps the most important use for the invention is the testing, in the field, of electric temperature indicating instruments as used on aircraft; and the invention will therefore be illustrated and described herein as applied to that use although as will become apparent hereinafter it has other uses.

The aircraft instruments referred to herein are those that register temperature indications on a dial scale in response to being energized with electric current supplied thereto from a current source, and varied in accordance with changes in the resistance of a resistance element subjected to the temperature to be indicated.

The resistance element is usually enclosed in a bulb-like chamber and the bulb is mounted so as to be immersed in the oil, gasoline-vapor, coolant, or other medium associated with the aircraft engine and whose temperature is to be indicated.

Besides the indicating instrument itself there is the said bulb, and, also, an electric system comprising the circuit to the bulb and to the instrument from the current source (usually a battery on the aircraft) and these component parts must be tested from time to time in order to insure reliability and accuracy and general air-worthiness of the temperature indicating apparatus, and particularly to locate and isolate the faulty component if the instrument should be found by the test to indicate incorrectly.

It is the primary object of the invention to provide an improved testing apparatus capable of making such tests.

Heretofore to test such temperature indicating apparatus, two general methods have been employed. According to one method, the resistance bulb is immersed alternately in hot and cold baths, the temperatures of which are predetermined by an ordinary thermometer, and readings on the indicating instrument are compared with the hot and cold readings of the thermometer. Such a method is not practicably applicable to testing instruments on an aircraft in the field; and in any event it tests the whole apparatus and not the several component parts of it so that if error is present the faulty component is not identified.

According to the other method the bulb is first disconnected from the system, and a plurality of resistance units of different known resistance values, are substituted for it, one after the other. The resistance values of the units are predetermined to correspond exactly to the value of the bulb resistance, at certain different temperatures thereof. The readings which the instrument should give for each of said units is therefore predetermined. This method requires a very high degree of accuracy in the manufacture of the resistance units, and their resistance must not vary with temperature, and all variations of resistance at contacts or the like, when the shift from one resistance unit to another is made, must be eliminated. Such a testing apparatus is therefore difficult to make and operate and is unreliable and generally unsatisfactory. In any event it tests only the temperature indicating instrument and the electric system as a whole and not its component parts.

According to the present invention, a testing set is provided which is readily portable for carrying it into and out of an aircraft. The set includes a standard, aircraft, temperature-indicating instrument of the bulb controlled type, as a master instrument, known to be correct, and a rheostat providing variable resistance. The aircraft source of instrument current, and the aircraft instrument and the testing set, are interconnected by harness conductors. The variable resistance is connected so that it can be substituted for the bulb resistance of the instrument. For any setting of the rheostat the aircraft instrument and the test set master instrument are actuated and their readings compared. Either the aircraft instrument or the instrument and its electric circuit can thereby be tested; and any fault that is present can be isolated and located as being in the instrument or in the circuit or in the res'stance bulb. The resistance values for different settings of the rheostat for different instrument readings need not be predetermined nor accurate and in fact need not be known.

It is a further object of the invention to provide a testing apparatus or set such as that referred to above.

There are in use today, single temperature indicating instruments on aircraft having one engine; and aircraft having more than one engine, have instruments in pairs, or two instruments built into a dual instrument.

It is a further object of the invention to provide a testing apparatus or set of the class referred to, capable of testing single instruments and dual instruments, and pairs of instruments.

In order to connect the testing apparatus or set to the apparatus on the aircraft to make a test, connecting conductors or harnesses must be provided as a part of the set, to make all of the necessary connections for either type of instrument, single or dual or in pairs; and to test the aircraft indicating instrument itself, or the instrument and its electric system.

It is accordingly a further object of this invention to provide a harness equipment for the above mentioned purposes having the minimum number of parts and of the maximum degree of simplicity, practicability, and ease of application.

Other objects will be apparent to those skilled in the art to which my invention appertains.

The invention is fully disclosed in the following description taken in connection with the accompanying drawing, in which:

Fig. 3 is a diagrammatic view illustrating a standard single aircraft temperature indicating instrument and the normal external circuits and connections thereto;

Fig. 4 is a diagrammatic view illustrating the manner of utilizing the invention to test the instrument and external circuits of Fig. 3;

Fig. 5 is a view similar to Fig. 3 but illustrating a double or dual instrument;

Fig. 6 is a view similar to Fig. 4 for testing the dual instrument and external circuits of Fig. 5;

Figure 1:
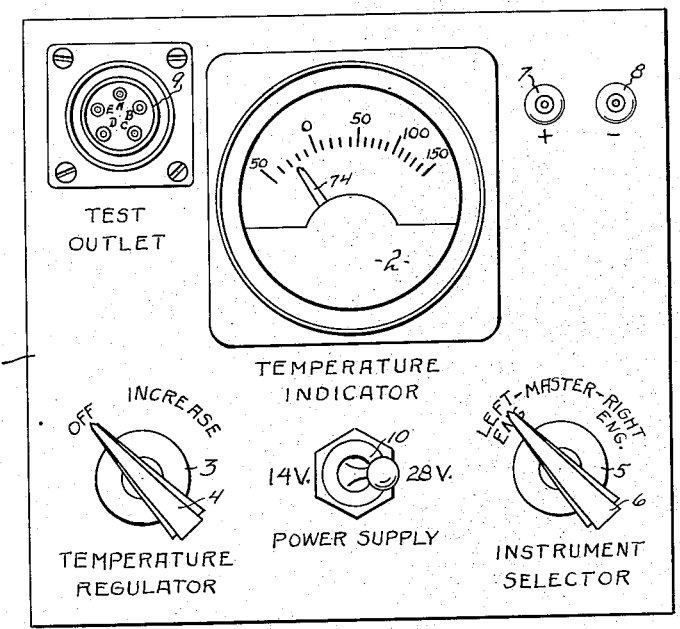
Fig. 1 is a top plan view of an apparatus or testing set embodying my invention; the view showing a control panel of the set and as constituting the top wall of a portable boxlike cabinet in which other parts are enclosed.
Figure 2:
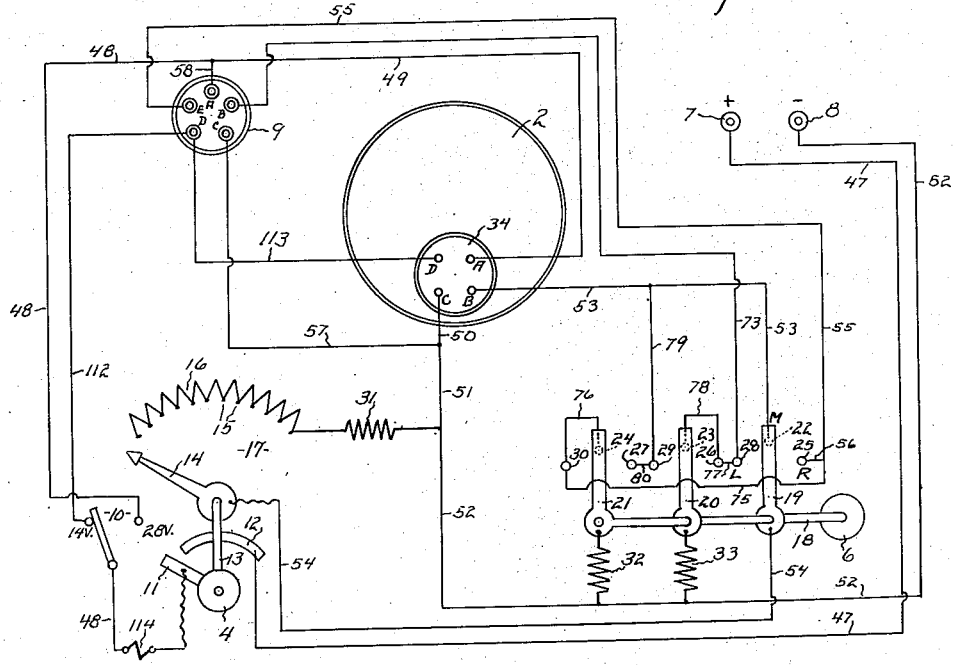
Fig. 2 is a diagram of electric circuits housed in the said cabinet under the panel of Fig. 1 and connected to terminals etc. on the panel.

Referring to the drawing, in Fig. 1 is illustrated certain parts of the testing set as mounted on a panel 1, and this panel may also constitute the top wall of a portable box or cabinet or like container, in which are housed electric circuits and other apparatus of the set. In Fig. 2 is illustrated diagrammatically the said electric circuits and the parts on the panel. The two figures may be considered together. At 2 is a standard aircraft temperature indicating instrument generally of the same type and construction as those to be tested, and designated on the panel as "Temperature indicator." It will be referred to herein as a master instrument or set instrument. In the use of the set it is known to indicate correctly. At 3 is a device designated on the panel as "Temperature regulator" and comprising a handle 4 for operating it. The handle has a counterclockwise position designated as "Off"; and upon rotating it clockwise, it is moved into an arcuate region designated by the legend "Increase."

At 5 is a device designated on the panel as "Instrument selector" and comprising a handle 6 for turning it, and having three positions; a middle position designated on the panel by the legend "Master" the same referring to the set or master instrument 2, and a counterclockwise and a clockwise position designated respectively by the legends "Left Eng." and "Right Eng." and referring to the left engine and right engine, of the aircraft whose instruments are to be tested. At 7 and 8 are electric connectors of the receptacle type to which electric connection may be made by male plug-type connectors to supply current to the set. At 9 is an electric receptacle connector of the type used on electrically energized aircraft instruments, the receptacle having five terminals or points of the female or sleeve type designated as A to E to which electric connections can be made by a corresponding plug connector having pin type terminal points.

At 10 is an electric switch designated by the legend "Power supply" for changing over the apparatus for use with 14 volt or 28 volt current, as indicated by the legends "14V" and "28V."

The Temperature Regulator handle 4 is connected to a switch arm 11 which upon rotating the handle 4 may be moved into or out of engagement with an arcuate switch contact 12. The handle 4 is connected by a shaft 13 to a rheostat arm 14 whereby upon rotating the handle 4 the arm 14 will engage, successively, points 15—15 of a resistor 16, the arm 14 and resistor 16 therefore constituting an adjustable rheostat designated as 17.

The instrument selector handle 6 is connected to a shaft 18 on which are mounted three switch arms 19, 20, and 21. For the mid-position of the handle 6 and shaft 18, the said switch arms engage respectively contacts 22, 23, and 24; and when the handle 6 and shaft 18 are rotated clockwise the arms respectively engage contacts 25, 26, and 27; and when rotated in the other direction the arms engage respectively contacts 28, 29, and 30.

At 31, 32, and 33 are resistance units.

The master instrument 2 is shown in Fig. 2 as having a receptacle connector 34 such as is usually provided on such instruments, and having four contact points identified as A, B, C, and D.

At this point it should be mentioned that certain receptacle connectors and plug connectors illustrated in the several figures of the drawing, and of which the receptacles 9 and 34 of Figs. 1 and 2 are examples, have the connection points thereof designated by letters A, B, C, etc. In practice, these letters have been conventionally adopted and are stamped on the receptacle and plug connectors by the manufacturer and are part of the apparatus itself. It is thought that to use additional reference characters for these points herein, would complicate the disclosure and serve no useful purpose, notwithstanding that the same letter is sometimes used on more than one part; and that in fact the disclosure will be made clearer by utilizing these letters to designate corresponding points of different parts of the apparatus which are connected together.

The various circuit conductors of Fig. 2, will now be described in connection with a description of the general operation of the circuits.

Reference may first however be made at this point to Fig. 3 which illustrates diagrammatically a temperature indicating instrument as installed in an aircraft. The instrument proper, 2A, is provided with a plug connector 35 of the male pin type having four pins A, B, C, and D. A receptacle connector 36 has corresponding sleeve type points or terminals A, B, C, and D telescoped respectively over the pins of the plug connector 35. A wire 37 leads from the sleeve point A to one side of a battery 38, the other side of the battery being grounded as at 39. A wire 40 leads from the sleeve point C to a ground 41. Wires 42 and 43 lead from the sleeves B and C to sleeve points B and A respectively on a receptacle 44, these sleeves being engaged with corresponding male pins on a resistance bulb 45, containing a resistor 46.

The internal connections of the instrument 2A need not be considered, being well known. One characteristic type of such connections is illustrated and described at page 59, of Technical Manual of Aircraft Instruments, TM-1-413, published by the War Department, February 2, 1942. It will therefore suffice here to say that current from the battery 39 flowing into the instrument 2A at the point A and out at the point C energizes the instrument; and that current flows from the point B over the wire 42 to the point B of the bulb 45 and through the resistance 46 of the bulb, and by way of point A and wire 43 to the point C of the instrument and controls the energization and indications of the instrument, in accordance with temperature effected changes of the bulb resistance 46, to cause the instrument 2A to indicate the temperature to which the bulb is exposed.

In accordance with this conventional arrangement of Fig. 3 and the conventional marking of the points A, B, C, etc., we may consider the points A and C as identifying the instrument energizing circuits, and the points B and C as identifying its control or bulb circuit wherever these pairs of points are referred to hereinafter.

Referring now again to Fig. 2, the instrument 2 has the same connection points A, B, C as the instrument 2A of Fig. 3, it being a standard aircraft temperature indicating instrument; and one of the purposes of the circuits of Fig. 2 is to energize the master instrument 2 by potential on the points A and C, and to control the reading of the instrument by variations of resistance across the points B and C by means of the rheostat 17 which corresponds to the energization and control of the instrument of Fig. 3 as described.

In Fig. 2 it is contemplated (in a manner to be described) that unidirectional potential will be applied to the receptacle terminals 7 and 8, positive and negative respectively, and current then will flow say from the receptacle 7, by a wire 47 to the arcuate contact 12, thence to the arm 11 (the temperature regulator handle 4 having been turned to engage these contacts) thence by a wire 48, including the switch 10, and a wire 49, to the point A on the master instrument 2, thence through the instrument to the point C and by wires 50, 51, and 52 to the other receptacle 8. The resistor 16 of the rheostat 17 is across the points B and C of the instrument 2 as follows. From the point B by a wire 53 to the contact 22, the switch arm 19, by a wire 54, to the rheostat arm 14, thence to one or another of the points 15 of the resistor 16, through the rest of the resistor, and through the resistance unit 31 and by wires 51 and 50 to the point C.

Upon moving the arm 14 over the points of the resistor 16 by rotating the handle 4, the master instrument 2 will be caused to indicate temperatures just as the instrument 2A of Fig. 3 indicates temperatures upon change of the resistance of its bulb resistor 46.

Thus upon application of potential to the receptacle terminals 7 and 8, the master instrument 2 is caused to indicate different temperatures in response to adjustments of the rheostat 17 when the instrument selector handle 6 is in the position illustrated which puts the arms 19, 20, and 21 in their midpositions, with the arm 19 on the master contact 22.

The wires 48 and 49 are connected to the point A of the receptacle 9 by a wire 58 and the point C of the receptacle is connected to the wires 50 and 51 by a wire 57. The above described connections show that the point A of the master instrument 2 is always connected to the positive terminal 7 and the point C always connected to the negative terminal 8 and that the corresponding points A and C on the receptacle 9 are likewise always connected to positive and negative respectively; and that the rheostat 17 is connected across the points B and C of the master instrument 2. In using the set of Figs. 1 and 2 to test an instrument as will be described, the points A, B, and C of the receptacle 9 are connected by a suitable conductor harness to the corresponding points A, B, and C of the instrument to be tested, and the rheostat 17 is then utilized to control the energization of the tested instrument and to this end is connected across the points B and C of the socket 9 for this purpose.

To do this, the instrument selector handle 6 is turned to move the switch arms 19, 20, and 21 counterclockwise to engage the contacts 28, 29, and 30. The point B of the receptacle 9 is then connected as shown in Fig. 2 by wire 73 to the contact 28 and through the arm 19 and by wire 54 to the rheostat arm 14 through the resistor 16 and resistor 31 and by wires 51 and 57 to the point C.

The foregoing applies to the circuit connections of the set as related to a single type instrument to be tested, such as shown in Fig. 3.

If the aircraft instrument to be tested is of the double or dual type, its connections will be as shown diagrammatically in Fig. 5. The dual instrument indicated at 2B has connection points A to E on a plug connector 59, engaged with sleeve points A to E of a receptacle connector 60. Energizing current goes through the instrument from a battery 61 by way of wire 62, points A and C and wire 63 to ground 64.

One part of the instrument is controlled by a "left" bulb 65 connected across points B and C of the instrument by a conductor 66 connecting the point B of the instrument to a sleeve point B on a receptacle connector 67 on the bulb, and by wires 63 and 68 connecting the point C of the instrument to the point A at the bulb. The other or "right" part of the instrument is controlled by a bulb 69 having a receptacle connector 70 to the points B and A of which are connected by wires 71 and 72—63 across the points E and C of the instrument.

When the set circuit of Fig. 2 is used in testing such a double or dual instrument, the rheostat 17 to test it will first be connected across the points B and C of the receptacle 9 as described above, to test one part of the instrument; and then will be connected across the points E and C of the receptacle to test the other part, and this is done by turning the instrument selector handle 6 clockwise to engage the arms 19, 20, and 21 with the contacts 25, 26, and 27 whereby the point E on the receptacle 9 is connected by a wire 55 to the contact 25 thence through the arm 19, and by wire 54 through the rheostat 17 and resistance 31 and by wires 51 and 57 to the point C.

Thus in general, the set instrument 2 and the instrument to be connected to the receptacle 9 for testing are alike and standard instruments, and of the type responsive to changes of resistance of a temperature exposed bulb resistance. In making a test of an instrument a reading is first taken on the set instrument 2 for an arbitrarily chosen setting of the rheostat 17 which in a sense is substituted for the bulb resistance of the instrument 2, this reading being taken with the instrument selector in its midposition illustrated. To test an instrument connected to the receptacle 9, its own bulb resistance is first disconnected from it as will be more fully described and the instrument selector handle 6 is turned to the left and the rheostat 17 in its said chosen position is thereby substituted for the bulb resistance of the instrument, and a reading taken on the tested instrument and compared with that of the set instrument; and if the tested instrument is a dual or double instrument the instrument selector handle 6 is turned to the right and the rheostat 17 in its said chosen position is thereby substituted for the bulb resistance of the other half of the tested instrument and a reading taken thereon and compared with that of the set instrument 2.

Instruments of this type are so responsive or sensitive that upon moving the instrument selector handle 6 to disconnect the resistor 16 from the bulb circuit of one instrument, and substitute it for the bulb resistance of another instrument, the indicating needle 74 of the instrument from which it has been disconnected, will be given a violent movement, and the instrument may be damaged thereby; and to avoid this, each time that the rheostat resistor 16 is disconnected from either the standard instrument 2, or from the instrument being tested, a predetermined fixed resistance is substituted for it and this is accomplished as follows.

As explained briefly above, the bulb circuit of the instrument to be tested is connected across the points B and C or across the points E and C of the receptacle 9. When the resistor 16 is connected across the bulb or control points B and C of the set instrument 2, which is for the midposition of the instrument selector, the resistance 33 is connected across the points B and C of the receptacle 9 as follows: from the point B of the receptacle by wire 73, a wire 77, a wire 78, the contact 23, through the arm 20, through the resistor 33 and by wires 52, 51, and 57 to the point C; and the resistor 32 is connected across the points E and C of the receptacle 9 as follows: from the point E by wire 55 and wires 75 and 76 to the point 24 and by arm 21 through the resistor 32 and by wires 52, 51, and 57 to the point C.

When the instrument selector is turned toward the left and disconnects the rheostat resistor 16 from the bulb or control points B and C of the set instrument 2, and connects it to the bulb points B and C of the receptacle 9, as described, the resistor 33 is connected across the points B and C of the set instrument 2 as follows: from the point B by wire 53, a wire 79, point 29, arm 20, resistor 33, wires 52, 51, and 59 to the point C; and the resistor 32 stays in the bulb circuit E—C of the receptacle 9, connections being from the point E, by wire 55, wire 75, point 30, by arm 21, through the resistor 32 to wire 52, wires 51 and 57, to the point C.

When the instrument selector is moved in the right position to put the resistor 16 across the bulb circuit points E and C, the resistor 32 is connected across the bulb points B and C of the set instrument 2, as follows: from the point B by wires 53, wire 79, wire 80, point 27, arm 21, resistor 32, wires 52, 51, and 59 to the point C; and the resistor 33 is connected across the points B and C of the receptacle 9 from the point B by wire 73, wire 77, point 26, arm 20, resistance unit 33, wires 52, 51, and 57 to the point C.

Thus upon moving the instrument selector switch handle 6 to connect the rheostat resistor 16 across the bulb points B and C of the instrument 2, or, for testing instruments, to connect it across the bulb points B and C or across the bulb points E and C of the receptacle 9, in each case the other bulb points are connected through a resistor for the purposes referred to.

The making of a test will now be described in the case of a temperature indicating instrument of a single instrument type, the diagrammatic circuits of which are shown in Fig. 3, and the testing apparatus and circuits for which are shown in Fig. 4.

The test set of Fig. 1 is here shown in simplified or diagrammatic form at 81. To supply current to the terminals 7 and 8, a pair of conductors 82 and 83 are provided having plug terminals 84 and 85 at one end adapted to be inserted into the receptacles 7 and 8 and at their other ends having so-called "alligator" clamp connectors 86 and 87. It is understood that the testing set 81 will be carried up into the aircraft, and the clamp connector 86 is connected to a point 88 on the battery 38 and the clamp connector 87 is connected to ground point 89 on the aircraft, thus making available, at the terminals 7 and 8 of the set, the potential of the battery.

The receptacle 44 on the resistance bulb 45, see Fig. 3, is disconnected from the bulb as shown in Fig. 4. A connecting harness is provided comprising four insulated conductors 90, 91, 92, and 93 all connected at one end to a male plug connector 94 having pin connectors B, C, and E; the wires 90 and 91 being connected in the plug respectively to the pins B and C and the wire 93 being connected to the wire 91 and the wire 92 being connected to the pin E. The wires 90 and 91 at their other ends are connected respectively to the pins B and A of a male plug connector 95, and the wires 92 and 93 being connected respectively to the pins B and A of a male plug 96. The plug 96 in this test is not used, but it is convenient to have it built into the harness so that the same harness can be used in tests in which both plugs 95 and 96 are used as will be described.

To make the test, the pins of the plug 94 are inserted into the corresponding sleeves of the receptacle 9 of the set and the pins of the plug 95 into the corresponding sleeves of the receptacle 44, and the pins 85 and 84 are inserted into the sleeves or receptacles 7 and 8 of the set.

The temperature regulator handle 4 is turned, Figs. 2 and 4, to close the switch 10 and to place the arm 14 in contact with some arbitrarily chosen point 15 on the resistor 16. Current from the battery 38 of the aircraft to the terminals 7—8 is thereby connected across the energizing points A and C of the set instrument 2; and battery current is connected across the points A and C of the instrument A2 as shown in Fig. 4. With the instrument selector handle 6 turned to the middle point "M" (indicating "Master," see Fig. 1) the instrument 2 will indicate a temperature corresponding to the rheostat resistance because as has been described in connection with Fig. 2, the resistor 16 is connected across the control points B and C of the instrument 2 and is therefore substituted for the bulb resistance of the instrument. When this reading on the instrument 2 has been observed, the instrument selector handle 6 is turned to the left position "L," Fig. 4, and as described for Fig. 2, the rheostat resistance is thereby disconnected from the points B and C of the instrument 2 and is connected across the points B and C of the receptacle 9, and this, by the wires 90 and 91 and 42 and 43 connects it across the points B and C of the instrument 2A. The instrument 2A will therefore indicate temperature corresponding to the said rheostat resistance setting and the reading may be compared to that which had just been made on the instrument 2 of the set; and if they are alike, and the set instrument 2 being known to be correct, then the instrument 2A reads correctly and it itself and its control circuit and connections are without fault. Both instruments are thus energized by the same potential across points A—C and controlled by the same potential across points B—C.

The rheostat 17, Fig. 2, is then set by the handle 4 to another arbitrarily chosen resistance value, and the instrument selector handle 6 is turned to first give a reading on the instrument 2, and then turned to give a corresponding reading on the instrument 2A, and their readings compared; and so on over the whole range of the instruments.

The test described for Fig. 4 is made, as will be seen, on both the single instrument 2A and the harness and connections leading to the control bulb 45. In Fig. 6 is shown a similar test on an instrument 2B which may be considered either as two separate interconnected instruments or as a single dual instrument such as shown in Fig. 5, described above. The receptacles 67 and 70 are first disconnected from their bulbs 65 and 69 as shown. The harness described for Fig. 4 is used comprising the plug connector 94 at one end of the harness, and the plug connectors 95 and 96 at the other end. Current is supplied to the receptacles 7 and 8 of the set 81 as before from the aircraft battery 61. The plug connector 94 is connected to the receptacle 9 and the plug connectors 95 and 96 are connected to the receptacles 67 and 70 as will be understood.

The temperature regulator handle 4 is moved to different positions successively to arbitrarily select rheostat resistance at the rheostat 17 (Fig. 2) and at each position the instrument selector handle 6 is moved first to its mid or "master" position and a reading made on the instrument 2, and then is moved to the left to give a reading on that part of the instrument 2B controlled by the wires 66 and 68 across the points B and C and a reading taken, and then is moved to the right to give a reading on that part of the instrument 2B controlled by the wires 72 and 71 connected across the points E and C of the instrument and the readings in both cases compared with those on the master instrument 2.

As will be observed the tests of Fig. 4 and Fig. 6 include as a part of the instrument 2A or 2B, the bulb resistance conductors and connectors thereto which in the case of the single instrument of Fig. 4 include the receptacles 44 and 36 and the harness connections 42, 43, and 37; and in the case of Fig. 6 includes receptacles 60, 67, and 70 and the harness connections 66, 68, 71, 72, 63, and 62.

Figure 7:
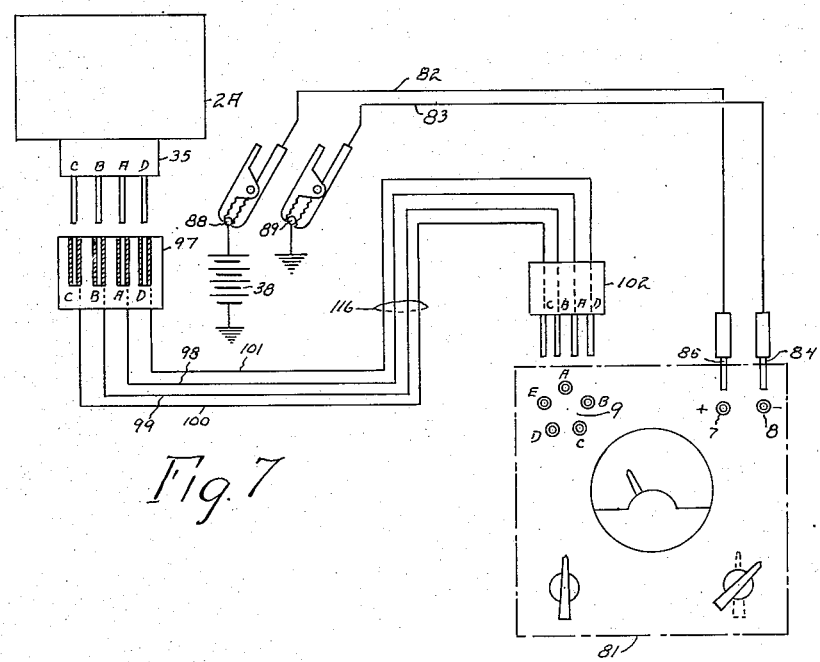
Fig. 7 is a view similar to Fig. 4 for testing the single instrument, alone, of Fig. 3.

To make a test of the single instrument alone such as shown in Fig. 3 and without its said connections, reference may be had to Fig. 7, which test by eliminating the harness connections, tests them after the first described test has been made.

To make this test, the female receptacle connector 36, see Fig. 4, is detached from the plug connector 35 and the instrument 2A will then appear as in Fig. 7 having the male pins A, B, C, and D projecting therefrom.

A harness is provided comprising a female receptacle connector 97 having sleeves A, B, C, and D therein for engagement with the pins A, B, C, and D of the instrument, and these sleeves are connected respectively by conductors 98, 99, 100, and 101 to male pins A, B, C, and D of a male connector 102 engageable with the sleeves of the receptacle 9 on the set 81.

The conductors 82 and 83 are again connected respectively to a point 88 on the aircraft battery 38 and to a ground point 89 and to the receptacles 7 and 8 on the set.

When the connectors 97 and 102 have been connected respectively with the receptacles 35 and 9, and the terminals 85 and 84 connected to the receptacles 7 and 8 on the set, the set will supply energizing current to the instrument 2A across the points A and C over the wires 98 and 100; and will connect the rheostat 17 of the set (Fig. 2) across the instrument control points B and C, by wires 99 and 100; and upon setting the rheostat resistance by the temperature regulator handle 4, the instrument selector handle 6 may be moved to the left and the tested instrument 2A will indicate a temperature, and upon moving it to the middle position, the master instrument 2 will indicate a temperature and the readings may be compared.

Figure 8:
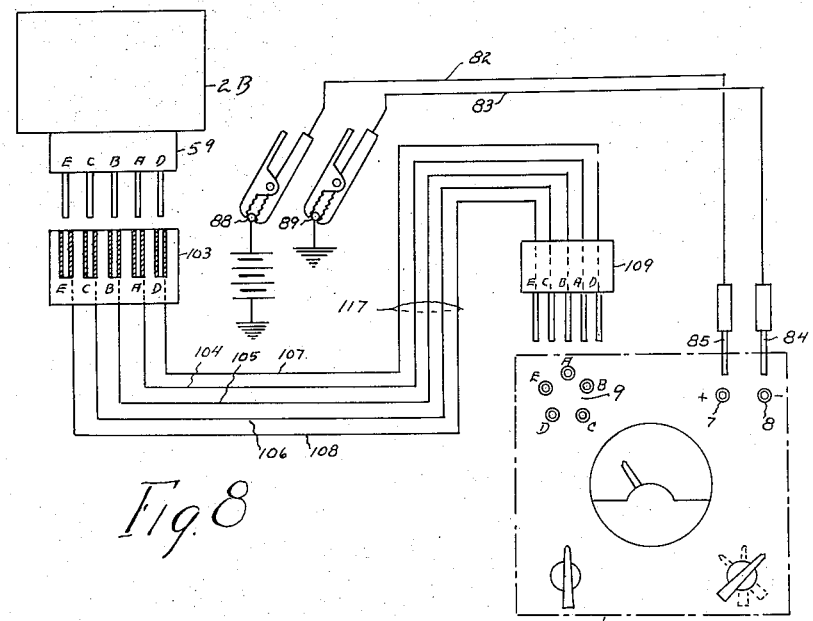
Fig. 8 is a view similar to Fig. 4 for testing the dual instrument, alone, of Fig. 5.

When the instrument to be tested alone is a dual or double instrument such as shown diagrammatically in Fig. 5, the arrangement of Fig. 8 will be utilized. The receptacle 60 is removed from the instrument leaving the plug connector 59 with five pins A to E projecting therefrom as shown in Fig. 8. A receptacle connector 103 having sleeves A to E inclusive to fit the pins of the connector 59 is provided to which are connected at one end insulated conductors 104, 105, 106, 107, and 108 and at the other end these conductors are connected respectively to the pins of a male connector 109. The receptacles 7 and 8 of the set are again connected as shown in Fig. 7. When the connectors 103 and 59 and the connectors 109 and 9 are connected together, and the temperature regulator handle 4 is set for some resistance value of the rheostat 17, the instrument selector handle 6 when moved to the middle position will give a temperature reading on the instrument 2; when moved to the left, the points A and C of the receptacle 9, by way of the wires 104 and 106 will energize the instrument 2B, and the rheostat resistance will control the reading on the instrument 2B by being connected across the points B and C by way of wires 105 and 106. When the instrument selector handle 6 is moved to the right, the instrument 2B will again be energized by current through the points A and C and will give a reading on the other half or other instrument as controlled by the rheostat resistance connected across the points E and C by way of wires 108 and 106.

These readings in each case may be compared with readings on the instrument 2 caused by moving the instrument selector handle 6 to the midposition.

In practice, the aircraft battery for operating the instruments may be either a 14 volt or a 28 volt battery. In Figs. 3 and 4 or in Figs. 5 and 6 if the battery is a 28 volt battery it will be connected as shown in solid line to the point A of the instrument; but if it is a 14 volt battery, this connection will be omitted and the battery will be connected to the point D of the instrument by the dotted line connection 110 in Figs. 3 and 4, and 111 in Figs. 5 and 6; the standard instruments (2 or 2A or 2B) being constructed to operate correctly when energized by either voltage, across the points A—C or the points D—C, respectively.

In making the tests of Figs. 7 or 8, the battery voltage is not connected directly to the instrument 2A or 2B (the receptacle connector 36 or 60 having been removed) but is connected to the instrument by the harness connections from the testing set to the receptacle connector 97 or 103. When the battery voltage is 28 volts, the switch 10 of Fig. 2 is turned to the "28V" side, and the battery current goes from the switch to the point A of the receptacle 9 over wire 48 as shown, and thence to the point A of the instrument 2 by wire 49 and to the point A of the instrument 2A or 2B over the harness wires 98 or 104. When the battery voltage is 14 volts, the switch 10 is turned to the "14V" side and the battery current coming to the switch 10 goes from it over wire 112 to the point D of the receptacle 9, and thence by a wire 113 to the point D of the set instrument 2, and to the point D of the instrument 2A or 2B over the harness wires 101 or 107, respectively.

A suitable value for each of the resistance units 32 and 33 is 100 ohms; and a suitable total resistance for the rheostat 17 is 168 ohms, but since the rheostat resistance (which takes the place of bulb resistance) is not wanted to be adjusted below, say, 68 ohms, for known reasons, a permanent resistor 31 of 68 ohms is placed in series with an adjustable resistor 16 of 100 ohms, whereby the advantage of a more practical adjustable resistor may be had.

A fuse 114 is placed in the line 48, Fig. 2, from the positive receptacle 7 of the set to open and protect the apparatus if the polarity applied to the receptacles 7 and 8 should by inadvertence be reversed.

It is necessary of course for a testing set such as that described above to comprise interconnecting conductors or harnesses for making connections between the set and the apparatus to be tested and it is important for practical reasons for the number of such harnesses to be kept to the minimum and still be able to make all of the desired tests such as those described above, which include testing a single instrument or a double or dual instrument and in each case to test them and their associated bulb circuits and connections as described for Figs. 4 and 6 or to test them alone and without said circuits and connections as described above for Figs. 7 and 8.

In the apparatus above described as will now be apparent these tests can all be made with a maximum of four harnesses illustrated in the drawing.

These harnesses may be identified as follows:

Harness 114, Figs. 4, 6, 7, and 8, comprising the supply conductors 82 and 83 and terminals at one of their ends for attachment to battery and ground connections, and plug terminals at their other ends for insertion into the receptacles 7 and 8.

Harness 115, Figs. 4 and 6, comprising the conductors 90, 91, 92, and 93, the connector 94 at one end and the connectors 95 and 96 at the other end.

A harness, 116, Fig. 7, comprising four conductors connected at one end to the connector 102 and at their other ends to the receptacle connector 97.

A harness 117, Fig. 8, comprising five conductors connected at one end to the plug connector 109 and at their other ends to the receptacle connector 103.

While the set of Fig. 1 is preferably made as described with receptacles 7—8 and 9 for receiving separately made and detachable harness conductors, it will be understood that these conductors may, if preferred be permanently attached to the set and permanently connected to the set circuit.

I claim:

1. A testing apparatus for testing electrically actuated temperature indicating instruments, of the type having an energizing circuit and a control circuit, and responsive to indicate temperatures corresponding to values of current in the control circuit; comprising: an electrically responsive temperature indicating master instrument of the type to be tested having an energizing circuit and a control circuit; input conductors to which a source of current may be detachably connected, and connected to said circuits, to supply current thereto; a rheostat comprising a resistance in the control circuit; a handle for operating the rheostat to set the resistance thereof at different definite unknown arbitrary resistance values to cause corresponding values of current to flow in the control circuit; the master instrument being responsive to indicate a definite temperature for each setting of the rheostat and corresponding value of control current; the apparatus comprising first and second output conductors connected to said energizing circuit and control circuit respectively, to which the energizing circuit and control circuit of the instrument to be tested may be detachably connected; a switch manually operable to either of two positions selectively, and in one position having connections with the master instrument control circuit which cause the said values of current to flow therein and in another position having connections with the said second output conductors to cause the values of current to flow therein to the control circuit of the instrument to be tested.

2. A testing apparatus for testing electrically actuated temperature indicating instruments, of the type having an energizing circuit and a control circuit, and responsive to indicate temperatures corresponding to values of current in the control circuit; comprising: an electrically responsive temperature indicating master instrument of the type to be tested having an energizing circuit and a control circuit; input conductors connected to said circuits to which a source of current may be detachably connected, to supply current to the said circuits; a rheostat comprising a resistance in the control circuit; a handle for operating the rheostat to set the resistance thereof at different definite unknown arbitrary resistance values to cause corresponding values of current to flow in the control circuit; the master instrument being responsive to indicate a definite temperature for each setting of the rheostat and corresponding value of control current; the apparatus comprising first and second output conductors connected to said energizing circuit and control circuit respectively to which the energizing circuit and control circuit of the instrument to be tested may be detachably connected; protecting resistance means; a switch manually operable to either of two positions selectively and in one position having connections with the master instrument control circuit which cause said current values to flow therein, and connections which include the protecting resistance means in the path of said second output conductors, and in the other position having connections which cause said current values to flow in the said second output conductors to the control circuit of the instrument to be tested and connections which include the protecting resistance means in the control circuit of the master instrument.

3. A testing apparatus for testing electrically actuated temperature indicating instruments, of the type having an energizing circuit and a control circuit, and responsive to indicate temperatures corresponding to values of current in the control circuit; comprising: an electrically responsive temperature indicating master instrument of the type to be tested having an energizing circuit and a control circuit; input conductors to which a source of current may be detachably connected, and connected to said circuits, to supply current thereto; a rheostat comprising a resistance in the control circuit; a handle for operating the rheostat to set the resistance thereof at different definite unknown arbitrary resistance values to cause corresponding values of current to flow in the control circuit; the master instrument being responsive to indicate a definite temperature for each setting of the rheostat and corresponding value of control current; the apparatus comprising output conductors connected to the control circuit of the master instrument to which the control circuit of the instrument to be tested may be detachably connected; a switch manually operable to either of two positions selectively, and in one position having connections with the master instrument control circuit which cause the said values of current to flow therein and in another position having connections with the said output conductors to cause the said values of current to flow therein to the control circuit of the instrument to be tested.

4. A testing apparatus for testing electrically actuated temperature indicating instruments, of the type having an energizing circuit and a control circuit, and responsive to indicate temperatures corresponding to values of current in the control circuit; comprising: an electrically responsive temperature indicating master instrument of the type to be tested having an energizing circuit and a control circuit; input conductors connected to said circuits to which a source of current may be detachably connected, to supply current to the said circuits; a rheostat comprising a resistance in the control circuit; a handle for operating the rheostat to set the resistance thereof at different definite unknown arbitrary resistance values to cause corresponding values of current to flow in the control circuit; the master instrument being responsive to indicate a definite temperature for each setting of the rheostat and corresponding value of control current; the apparatus comprising output conductors connected to said control circuit of the master instrument to which the control circuit of the instrument to be tested may be detachably connected; protecting resistance means; a switch manually operable to either of two positions selectively and in one position having connections with the master instrument control circuit which cause said current values to flow therein, and connections which include the protecting resistance means in the path of said output conductors, and in the other position having connections which cause said current values to flow in the said output conductors to the control circuit of the instrument to be tested and connections which include the protecting resistance means in the control circuit of the master instrument.

5. In connection with an electrically actuated temperature indicating instrument of the type that has an electrically energizable actuating circuit comprising as a part thereof a circuit branch, the value of current in which branch determines the instrument indications, and which branch contains resistance responding to temperature changes to vary the current in the branch; the method of testing the instrument by comparing indications thereof with indications of a master instrument having an electrically energizable actuating circuit including as a part thereof a circuit branch the value of current in which branch determines the master instrument indications, and the master instrument being without resistance in the branch that responds to temperature changes to vary the branch current; the method including: energizing the actuating circuits of both instruments with equal energization; opening the branch of the instrument-to-be-tested to render the temperature responsive resistance thereof ineffective; supplying current of an arbitrarily chosen, non-varying value to the branch of the master instrument; reading the indication of the master instrument thus effected; diverting the said current from the branch of the master instrument to the branch of the instrument-to-be-tested; reading the indication of the instrument-to-be-tested thus effected; comparing the said readings; and repeating with other arbitrarily chosen non-varying values of current.

CARL F. DUERR, Jr.

REFERENCES CITED

The following references are of record in the file of this patent:

UNITED STATES PATENTS

| Number | Name | Date |
| --- | --- | --- |
| 920,652 | Ricketts | May 4, 1909 |
| 1,372,821 | Knopp | Mar. 29, 1921 |
| 1,397,641 | Kolff | Nov. 22, 1921 |
| 1,460,530 | Brown et al. | July 3, 1923 |
| 1,791,471 | Sporn et al. | Feb. 3, 1931 |
| 1,877,739 | Schneider | Sept. 13, 1932 |
| 1,983,665 | Hickok | Dec. 11, 1934 |
| 2,452,614 | Teetsell | Nov. 2, 1948 |

OTHER REFERENCES

Publication entitled "Aircraft Instruments," Feb. 2, 1942, War Department Technical Manual No. 1-413.